US009559914B1

(12) United States Patent
Groenewald

(10) Patent No.: US 9,559,914 B1
(45) Date of Patent: Jan. 31, 2017

(54) COMPUTING INSTANCE PLACEMENT

(71) Applicant: Amazon Technologies, Inc., Reno, NV (US)

(72) Inventor: Michael Groenewald, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 14/331,074

(22) Filed: Jul. 14, 2014

(51) Int. Cl.
*G06F 15/18* (2006.01)
*G06N 5/02* (2006.01)
*H04L 12/24* (2006.01)
*G06N 99/00* (2010.01)

(52) U.S. Cl.
CPC .............. *H04L 41/50* (2013.01); *G06N 99/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,762,538 B2 * | 6/2014 | Dutta | .................... | G06F 9/5066 709/223 |
| 8,806,015 B2 * | 8/2014 | Dutta | .................... | G06F 9/5066 709/221 |
| 9,003,346 B1 * | 4/2015 | Dutta | ................. | G06F 17/5072 716/118 |
| 9,043,787 B2 * | 5/2015 | Neuse | ................... | G06F 9/5088 718/1 |
| 9,104,453 B2 * | 8/2015 | Anand | ................ | G06F 9/45533 |
| 9,116,803 B1 * | 8/2015 | Agrawal | ............. | G06F 11/0751 |
| 9,152,443 B2 * | 10/2015 | Neuse | ................. | G06F 9/45533 |
| 9,250,947 B2 * | 2/2016 | Anand | ................ | G06F 9/45533 |
| 9,251,156 B2 * | 2/2016 | Tamano | ............ | G06F 17/30094 |
| 9,292,354 B2 * | 3/2016 | Michael | ................... | G06N 5/04 |
| 9,298,512 B2 * | 3/2016 | Gulati | ..................... | G06F 9/505 |
| 9,317,487 B1 * | 4/2016 | Zhao | ................. | G06Q 30/0277 |
| 9,396,008 B2 * | 7/2016 | Neuse | ................. | G06F 9/45533 |

OTHER PUBLICATIONS

Using Mussel-Inspired Self-Organization and Account Proxies to Obfuscate Workload Ownership and Placement in Clouds Justin L. Rice; Vir V. Phoha; Philip Robinson IEEE Transactions on Information Forensics and Security Year: 2013, vol. 8, Issue: 6 pp. 963-972, DOI: 10.1109/TIFS.2013.2259158 IEEE Journals & magazines.*

(Continued)

*Primary Examiner* — Michael B Holmes
(74) *Attorney, Agent, or Firm* — Thorpe North & Western LLP

(57) ABSTRACT

A technology is described for determining a placement of a computing instance within a virtualized computing service. An example method may include receiving a computing group state for a server that provides a virtualized computing service. The server may include a computing slot which may be used to execute a computing instance. Weighting values for placement factors may be identified for the computing group state. A placement score may be calculated for the computing slot based at least in part on the weighting value for the placement factor.

18 Claims, 12 Drawing Sheets

(56) References Cited

OTHER PUBLICATIONS

Optimal Placement-aware Trace-Based Scheduling of Hardware Reconfigurations for FPGA Accelerators Joon Edward Sim; Weng-Fai Wong; Jürgen Teich Field Programmable Custom Computing Machines, 2009. FCCM '09. 17th IEEE Symposium on Year: 2009 pp. 279-282, DOI: 10.1109/FCCM.2009.49 IEEE Conference Publications.*

VNF-P: A model for efficient placement of virtualized network functions Hendrik Moens; Filip De Turck 10th International Conference on Network and Service Management (CNSM) and Workshop Year: 2014 pp. 418-423, DOI: 10.1109/CNSM.2014.7014205 IEEE Conference Publications.*

A Capacity Allocation Approach for Volunteer Cloud Federations Using Poisson-Gamma Gibbs Sampling Abdelmounaam Rezgui; Gary Quezada; M. Mustafa Rafique; Zaki Malik 2014 IEEE 7th International Conference on Cloud Computing Year: 2014 pp. 288-295, DOI: 10.1109/CLOUD.2014.47 IEEE Conference Publications.*

\* cited by examiner

COMPUTING INSTANCE PLACEMENT

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing each customer with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

A request to launch a computing instance may entail identifying available computing resources (e.g., a computing slot in a hypervisor) on which the computing instance may be executed. For example, one or more physical computing machines (e.g., server computers) may be queried to determine whether sufficient computing resources exist on a physical computing machine to launch and execute a computing instance. In a case where a physical computing machine is identified as having computing resources available to execute the computing instance, the computing instance may be launched on the physical computing machine, and a customer may be notified that the computing instance has been launched.

DETAILED DESCRIPTION

Figure 1:
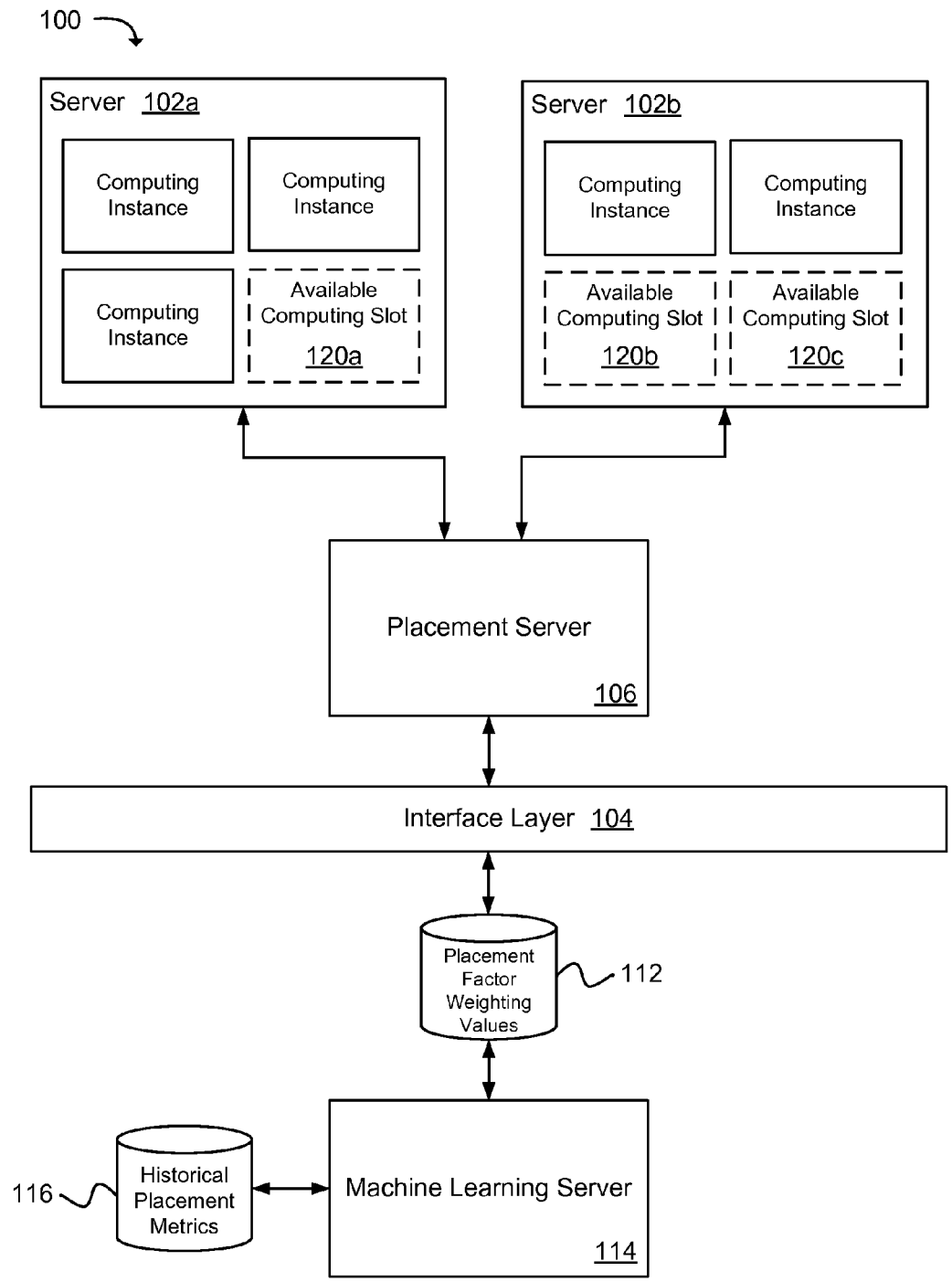
FIG. 1 is a block diagram illustrating an example system for placing a computing instance in a server included in a computing service environment.

A technology is described for determining a placement of a computing instance on a server computer within a computing service environment. The computing service environment may comprise a plurality of servers executing computing instances. In one example configuration, servers within a computing service having available computing slots (e.g., computing resources used to execute a computing instance) may be identified and the available computing slots may be ranked by determining a placement score for an available computing slot where the placement score may be determined at least in part on weighting values for placement factors for an individual server, where the weighting values may be determined by a machine learning model that uses historical input placement factors from a computing group state. The placement score may represent whether an associated computing slot may be a good candidate for executing a computing instance based on one or more predetermined computing group state objectives. Examples of predetermined computing group state objectives may include, but are not limited to: full utilization of computing resources, distribution of computing instances resulting in minimal impact on customers in the event of a system failures, distribution of computing instances among servers resulting in minimal software licensing costs, etc.

An initial step toward calculating a placement score for a computing slot may, in one example, involve querying a server or a number of servers for information about the current computing group state of the servers. The computing group state may include information that relates to various placement factors (e.g., factors that may have an impact on predetermined computing group state objectives). For example, a computing group state may include information about a distribution of computing instances among the servers of a computing service, information about software being executed by various computing instances on a server, information about ownership of various computing instances, information about a processing load of a server or any other information that may be associated with a computing group state objective.

Based on the computing group state of the server(s), weighting values for placement factors related to the computing group state may be identified. The weighting values may be determined using historical placement metrics and a machine learning model (e.g. a neural network). The weighting values may be used to calculate a placement score for a computing slot on a server. For example, a placement factor representing server utilization for the server (e.g., a density of computing instances executing on a server) may have a weighting value applied indicating how much server utilization may be a factor for the overall computing group state in selecting a computing slot to place a computing instance. A placement score may be calculated for the available computing slots and a computing slot having the highest score may be selected to execute a computing instance.

Determining a placement of a computing instance based on various heuristics limited to the scope of a single server containing available computing slots may result in a placement that does not promote a broader computing group state objective. By considering the wider scope of the computing group state of multiple servers within a computing service environment along with the state of an individual server and determining a placement of a computing instance by applying weighting values to placement factors of the individual server, a computing group state objective may be promoted.

FIG. 1 is a diagram illustrating a high level example of a system 100 that may be used to determine a placement of a computing instance on a server 102a-b within a computing service environment. The computing service environment may contain a number of servers 102a-b (e.g., thousands or even hundreds of thousands of servers) executing a number of computing instances that customers may utilize for various tasks. The computing service environment may include an interface layer 104 that exposes APIs (Application Programming Interfaces) or other interfaces to a number of computing services. The system 100 may include a placement server 106 that may be in communication with a machine learning server 114 and one or more servers 102a-b executing a number of computing instances. The placement server 106 may be used to identify a computing slot 120a-c located on a server 102a-b in which a computing instance may be loaded.

In one example configuration, a machine learning server 114 may be configured to execute a machine learning model used to classify different computing group states of the servers 102a-b within a computing service environment. Examples of machine learning models that may be used to identify a computing group state include, but are not limited to, a neural network model, a genetic algorithm model, a regression model or a hidden Markov model.

In one example, a machine learning model may determine weighting values that correspond to placement factors for a computing group state by way of historical placement metrics 116 (e.g., metrics collected over a time period that are associated with loading computing instances in computing slots within a computing service environment) used to train the machine learning model. For example, the machine learning model may determine weighting values by receiving the historical placement metrics 116 as input features and applying the input features to a machine learning model which outputs the weighting values for the computing group state. The weighting values may be updated based on whether and where the input features indicate that the computing group state is out of balance according to a computing group state objective. In another example, weighting values may be determined for placement factors for the computing group state of the servers 102a-b by querying the servers 102a-b for a current computing group state and inputting the current computing group state into a machine learning model as described above.

In one example, an outcome of a placement of a computing instance using a computing group state may be determined by a pre-defined method or a calculation for giving slot rankings for placement slots. The method for identifying slots may be numerically adjusted by assigning weighting values to placement factors that may be included in the method for identifying placement slots. For example, a computing group state may be defined by a number of placement factors. A placement factor may be a category that has a value representing a predetermined computing group state objective for that placement factor. A weighting value assigned to a placement factor may be based on the overall computing group state for that placement factor. For example, if the overall computing group utilization density is currently high, then a weighting value for a utilization density placement factor may be a high value.

As an illustration, the following placement factors may be defined and included in a historical computing group state: a server utilization placement factor, a licensing cost placement factor and a disaster impact placement factor. Using a machine learning method designed to process historical placement metrics 116, a weighting value may be assigned to each of the placement factors according to how the computing group may be affected by the placement of a computing instance. For example, where maintaining high server utilization is desired, the server utilization factor may receive a high weighting value. In a case where the placement of the computing instance may have a neutral effect on software licensing costs, the licensing cost placement factor may receive a lower weighting value as compared to the weighting value assigned to the utilization placement factor. In a case where placement of the computing instance in an overall computing service environment may currently have a negative effect on a number of customers impacted due to a system failure, a weighting value assigned to the disaster impact placement factor may be a high value.

After determining weighting values for placement factors included in a historical computing group state using a machine learning method trained based on the historical placement metrics 116, the weighting values 112 may be stored in a data store that may be accessible to the placement server 106. In one example, the placement server 106 may receive placement requests to identify computing slots 120a-c in which a computing instance may be loaded.

The placement server 106 may also include modules and/or processes configured to query the servers 102a-b within a computing service environment for computing group state information at the time that a computing instance placement is being determined. The computing group state information may then be used to identify weighting values for placement factors resembling a model computing group state.

In one example configuration, weighting values 112 for placement factors identified for the computing group state of the servers 102a-b at the time of computing instance placement may be retrieved from a data store containing the weighting values 112, and the weighting values 112 may be used in calculating a placement score for an available computing slot 120a-c. The placement score may indicate whether the available computing slot 120a-c may be a good candidate for placing a computing instance.

As an illustration, placement factors with weighting values 112 may include a server utilization placement factor, a licensing cost placement factor and a disaster impact placement factor. A server 102a with an available computing slot 120a may be queried for the state of the server 102a. The state of the server may include information corresponding to the placement factors above (e.g., information about server resources utilized to execute computing instances, information about software being executed by computing instances and information about customer ownership of executing computing instances). The server state information related to the placement factors may have scores assigned to the server state factors based on the state of the server 102a compared to one or more computing group state objectives. A placement score may then be calculated for the available computing slot 120a by applying the weighting values for the placement factors to the scores of the server state factors. A placement score may be calculated using a method that sums the weighted values, multiplies the weighted values or utilizes another method of calculation.

After calculating placement scores for the available computing slots 120a-c within the computing service environment, in one example, an available computing slot 120a-c having the highest placement score may be selected and a computing instance may be loaded into the available computing slot 120a-c. The high placement score of the available computing slot 120a-c may indicate that placement of a computing instance in the available computing slot 120a-c may have an overall positive effect on the desired computing group state of the computing service environment in which the available computing slot 120a-c exists.

Making computing instance placement decisions using a method that may consider multiple placement factors having weighting values that can be updated according to a computing group state of a computing service environment may result in dynamic computing instance placement decisions that benefit a computing group state at a global level as conditions change overall within the computing service environment.

Figure 2:
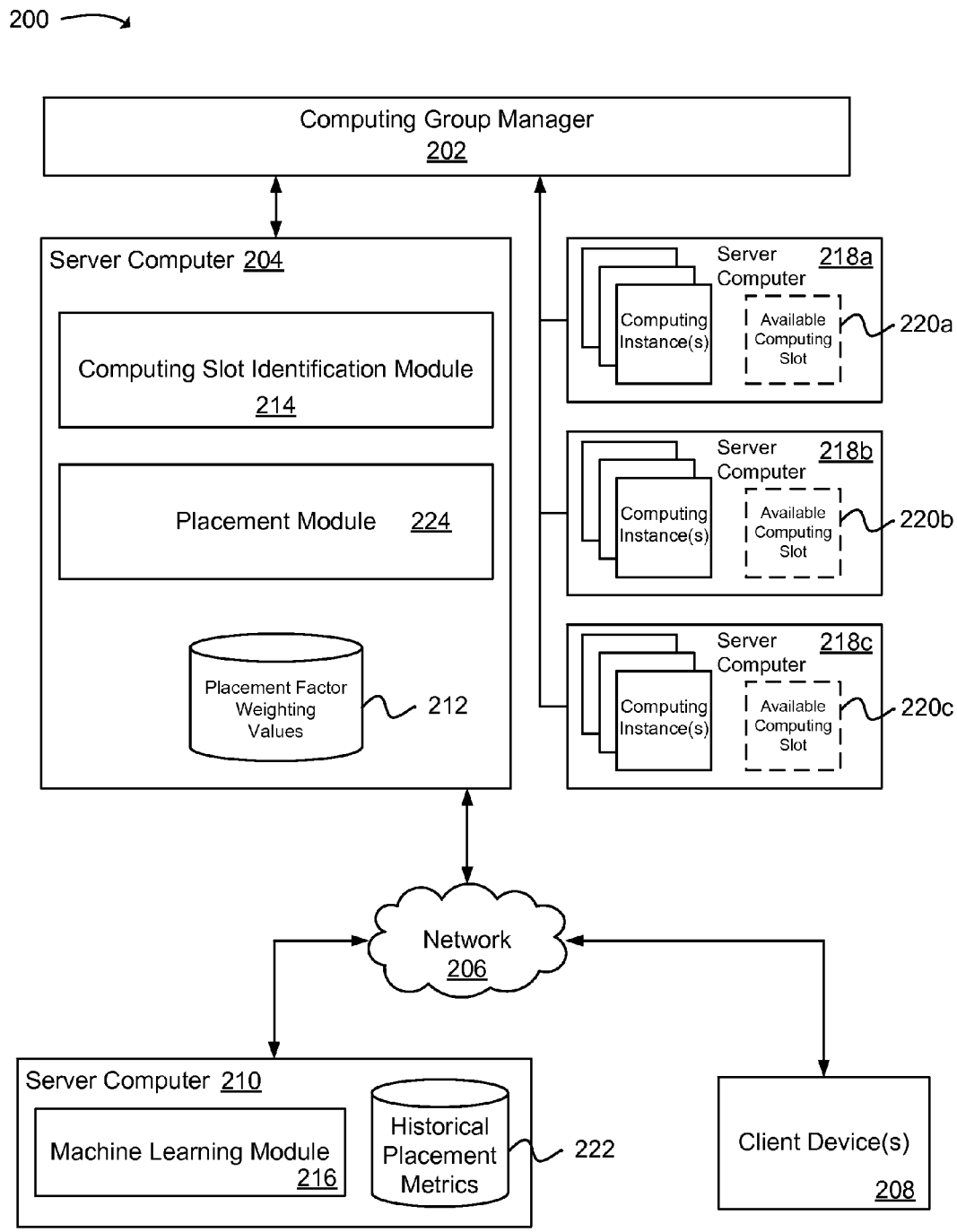
FIG. 2 is a block diagram that illustrates various example components included in a system for placing a computing instance in a server of a computing service environment.

FIG. 2 illustrates components of an example system environment 200 on which the present technology may be executed. The system environment 200 may include a server computer 204 that may be in communication with a server computer 210 containing a machine learning module 216 and a number of client devices 208 via a network 206. The server computer 204 may contain a number of modules used to determine a placement of a computing instance, and a number of server computers 218a-c executing a plurality of computing instances.

The server computers 218a-c may have available computing slots 220a-c (e.g., idle computing resources) that may be used to execute a computing instance. The available computing slots 220a-c may be allocated to customers who may then utilize an available computing slot 220a-c to execute a computing instance. Examples of computing instances may include on-demand computing instances, reserved computing instances and interruptible computing instances. An on-demand computing instance may be a computing instance that a customer may purchase and execute upon request. A reserved computing instance may be a reservation for a computing instance that a customer may purchase for a defined period of time making the computing instance available when the customer requests the computing instance, and an interruptible computing instance may be a computing instance that may be executed in a computing slot 220a-c not being used by another computing instance type unless the price being paid for the interruptible computing instance falls below a current bid price.

The server computer 210 may include a machine learning module 216 that may be used to determine weighting values 212 for placement factors. Weighting values may be assigned to the placement factors based on whether a placement factor contributes to a computing group state objective as described earlier. Various machine learning models may be used to determine weighting values 212 based on historical placement metrics 222, some of which may compare computing group states of a compute service before and after a placement of a computing instance in an available computing slot. Weighting values 212 assigned to placement factors may represent an amount of consideration that may be given to a particular placement factor. Weighting values 212 for placement factors produced by the machine learning module 216 may be made available to other modules located on the server computer 204 via a data store containing the weighting values 212.

The server computer 204 may include a computing slot identification module 214 and a placement module 224. The computing slot identification module 214 may be configured to identify available computing slots 220a-c located on the servers 218a-c. In one example, the computing slot identification module 214 may be configured to query a computing group manager 202 to determine an amount of computing capacity that may be available on a server 218a-c. Computing capacity may include an amount of processing capacity and memory capacity that a server 218a-c may have available to execute one or more computing instances.

The placement module 224 may be used to identify a computing slot 220a-c in which to load a computing instance. In one example configuration, the placement module 224 may be used to receive a placement request for a computing instance and identify a computing slot 220a-c in which to load the computing instance. A computing slot 220a-c may be selected that has a placement score indicating that selection of the computing slot 220a-c may create or maintain a computing group state that promotes one or more computing group state objectives.

Upon receiving a computing instance placement request, a computing group state of the servers 218a-c may be obtained by querying a computing group manager 202 for information about the state of the servers 218a-c. Weighting values 212 for placement factors related to the computing group state of the servers 218a-c may be identified. The weighting values 212 may then be applied to the placement factors for the available computing slots 220a-c and a placement score may be calculated based on the weighting values 212. The placement scores of the computing slots 220a-c may then be compared and a computing slot 220a-c may then be selected based on the placement score of the computing slot 220a-c.

A customer may utilize a client device 208 to request a computing instance and to control an executing computing instance. A client device may include any device capable of sending and receiving data over a network 206. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

The various processes and/or other functionality contained within the system environment 200 may be executed on one or more processors that are in communication with one or more memory modules. The system environment 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 206 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
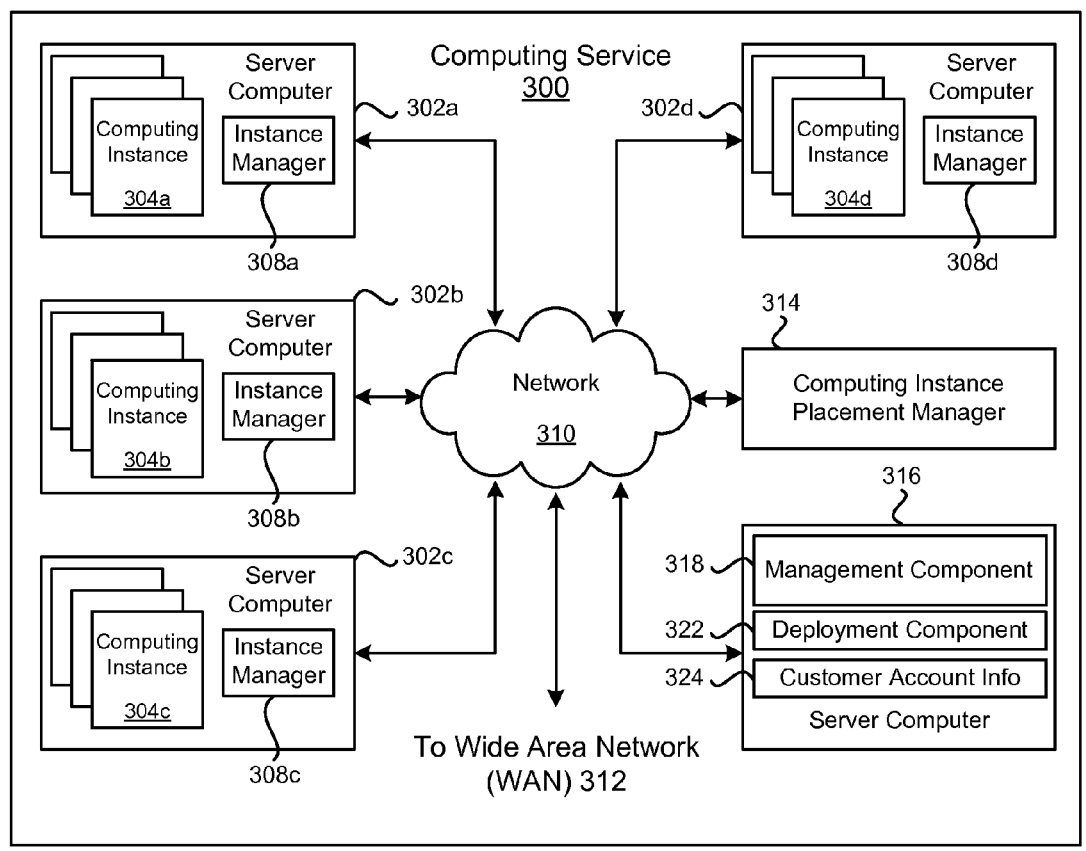
FIG. 3 is a block diagram that illustrates an example computing service environment that includes a computing instance placement manager.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a computing instance placement manager that may perform functions, such as querying the server computers 302a-d for available computing slots and computing group state information, as well as determining a placement of a computing instance 304a-d in an available computing slot.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
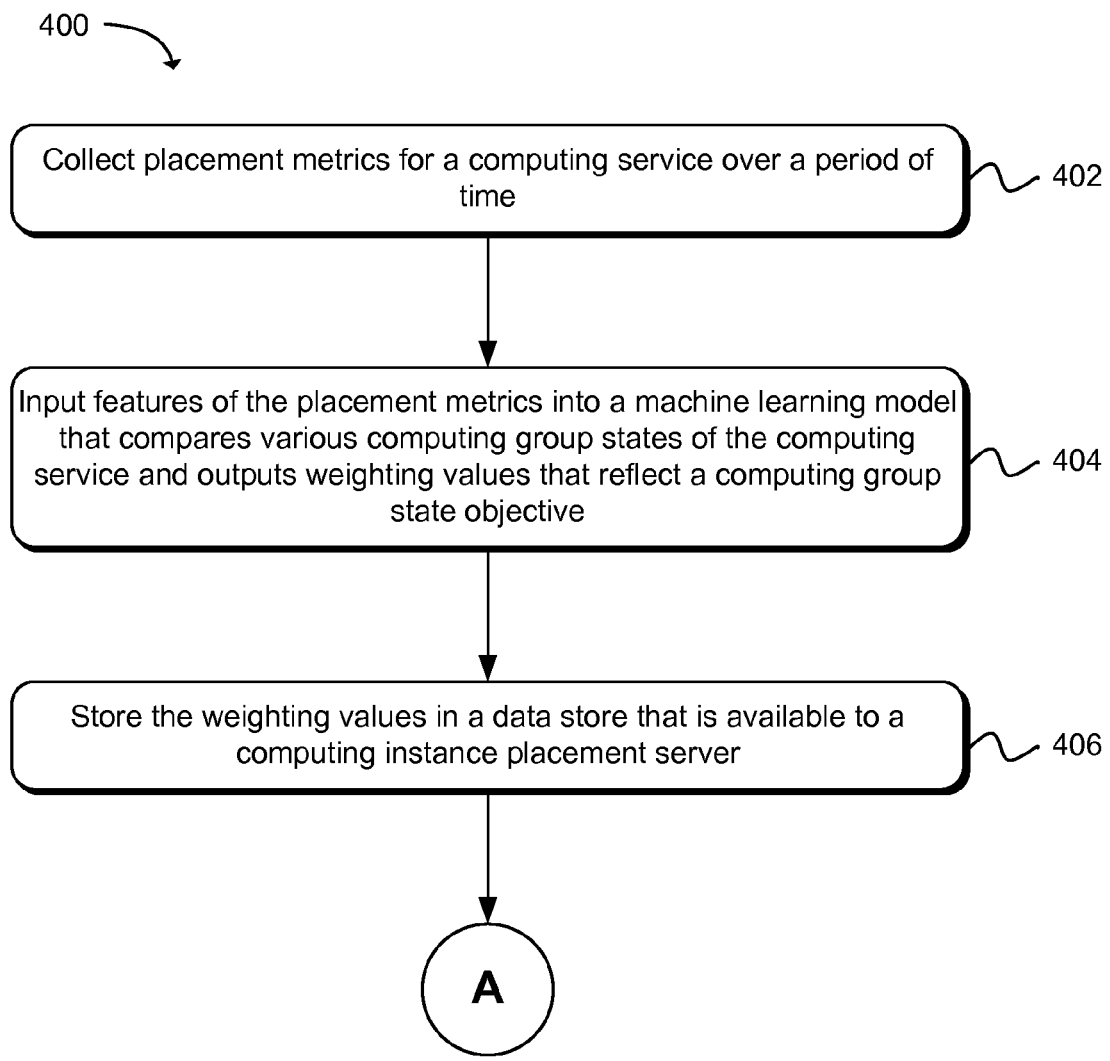
FIG. 4 is a flow diagram illustrating an example method for classifying a computing group state using historical placement metrics.

Moving now to FIG. 4, a flow diagram illustrates an example method 400 for determining weighting values for placement factors in a computing service environment using a machine learning method trained by historical placement metrics. The resulting weighting values may then be made available for use in determining a computing instance placement. More specifically, weighting values may be created for placement factors used in ranking placement slots for computing instances. Beginning in block 402, placement metrics for a computing service may be collected over a period of time.

As in block 404, features (e.g., placement measurements) of the placement metrics may be input into a machine learning model that compares various computing group states of the computing service based on the features, and then outputs weighting values for placement factors related to the various computing group states. Comparison of the computing group states may be based in part on a computing group state objective, which may be reflected in the weighting values. Examples of machine learning models that may be used to identify a computing group states using historical placement metrics may include, but are not limited to, a neural network model, a genetic algorithm model, a hidden Markov model or a regression model.

Output from a machine learning method may include weighting values for multiple placement factors included in a computing group state model where each placement factor may represent a different predetermined computing group state objective. As an example, predetermined computing group state objectives that may be associated with placement factors may include, but are not limited to: a server utilization placement factor representing a predetermined system objective to maximize server utilization among the servers included in a computing service; a licensing placement factor representing a predetermined system objective to minimize software licensing costs associated with the placement of computing instances on servers included in the computing service; a customer impact placement factor representing a predetermined objective to minimize an impact of a computing service failure (e.g., server failure, rack failure, availability zone failure or hardware failure) on a customer's executing computing instances; a server impact placement factor representing a predetermined objective to minimize an impact of transitory events (e.g., the launching of a computing instance) on a server included in the computing service; and an instance launch time placement factor representing a predetermined system objective to decrease an amount of time in which a computing instance is launched on a server.

A weighting value assigned to a placement factor may indicate an influence that the placement factor has in selecting an available slot in order to promote a predetermined computing group state objective. For example, a placement factor having a high weighting value may indicate that the specific placement factor is desired to be emphasized on a computing group state in order to promote a computing group state objective associated with the placement factor. A placement factor having a lower weighting value may indicate the placement factor is not being encouraged within the overall computing group.

As a specific example of determining weighting values for placement factors, the placement factors may include a server utilization placement factor, a licensing placement factor and a disaster impact placement factor where each of the placement factors represent different predetermined computing group state objectives as illustrated above. Based on the machine learning method trained using historical placement metrics as described earlier, the server utilization placement factor may receive a high weighting value when placement of a computing instance promotes server utilization with a computing service, or may receive a low weighting value when placement of the computing instance does not promote server utilization within the computing service. Likewise, the licensing placement factor may receive a weighting value depending upon how placement of the computing instance impacts software licensing costs as a result of placing computing instances executing the same software over a number of servers, and the disaster impact placement factor may receive a weighting value based on how a customer may be impacted in the event of a server failure containing the customer's computing instances.

In some cases, placement factors may represent predetermined computing group state objectives that conflict with one another. For example, a predetermined computing group state objective to optimize utilization of servers by tightly packing computing instances onto a single server may conflict with a predetermined computing group state objective to minimize an impact of a server failure on a customer's executing computing instances. In order to reduce conflict between competing placement factors, in one example, a weighting value assigned to a first placement factor may be reduced when the first placement factor conflicts with a second placement factor in order to satisfy a predominant computing group state objective. In one example, placement factors may be ranked to establish a predominant computing group state objective when using a machine learning model that considers placement factors individually rather than collectively, such as a regression model. For example, placement factors representing the computing group state objectives may be ranked based upon an importance of a computing group state objective as compared to other computing group state objectives. As a specific example, a disaster impact placement factor may be ranked higher than a server utilization placement factor when a predominant computing group state objective is to minimize an impact of a server failure on a customer's executing computing instances.

After determining the weighting values for the placement factors, a machine learning model may output assigned weighting values for the placement factors. Returning to FIG. 4, as in block 406, the weighting values may then be stored in a data store that may be available to a placement module that determines the placement of a computing instance within a computing service environment. Having generated the weighting values based on the historical placement metrics, the weighting values may then be used to select a computing slot that contributes to an improved computing group state of a computing service as described below.

Figure 5:
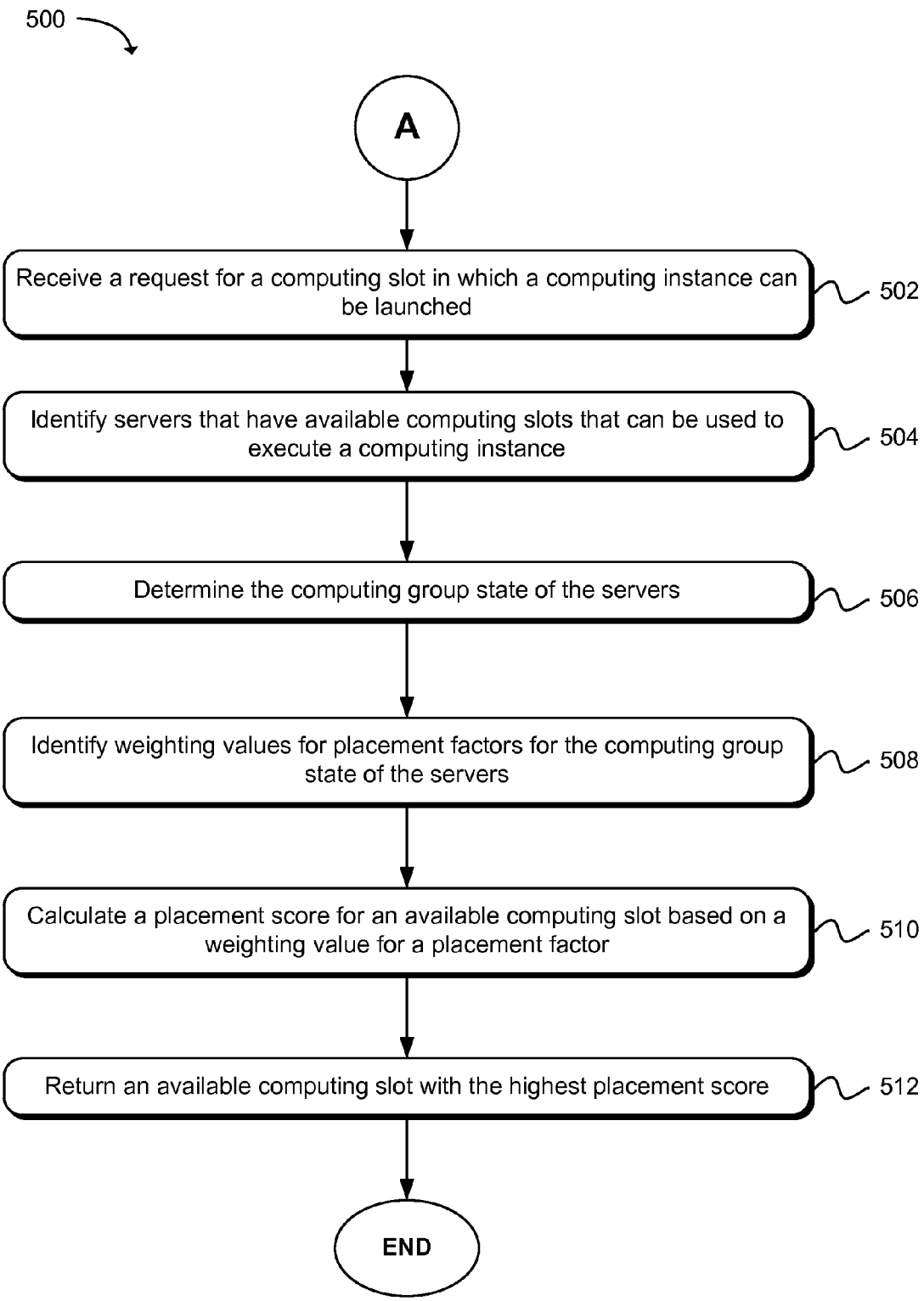
FIG. 5 is a flow diagram that illustrates an example method for determining a computing instance placement within a compute service.

FIG. 5 is a flow diagram illustrating one example method 500 for determining a placement of a computing instance within a computing service. A computing service may include a group of servers that make up the computing service where each server may have the ability to execute multiple computing instances concurrently. The group of servers may have available computing slots that may execute a computing instance. In computing services where the present technology may not be implemented, computing instances may be distributed among servers of the compute service based at least in part on various heuristics that may not be based machine learning and on historical placement metrics. As a result, placement of computing instances among the servers of the compute service may not benefit from historical placement analysis that may be used to determine a placement that promotes various computing group state objectives. The following example method 500 makes use of weighting values based on machine learning methods trained using historical placement metrics to determine a computing instance placement that may further various computing group state objectives as described in relation to FIG. 4.

Beginning in block 502, a computing service may receive a request to launch a computing instance. In response, a request may be made to a placement service for an available computing slot in which the computing instance may be executed. As computing instances are launched and terminated within a computing service environment, a number of computing slots may be made available within the group of servers included in the computing service. As in block 504, servers having available computing slots in which a computing instance may be executed may be identified. For example, the servers may be queried to determine which servers may have available computing slots (i.e., computing capacity, comprising processing capacity and memory capacity), that can be used to execute a computing instance. The computing slots identified may include attributes that, for example, contain information about a server on which the computing slot resides.

As in block 506, a computing group state of a server or an aggregate of servers that make up the computing service may be determined. The computing group state may include information about the server(s) that may be related to various computing group state objectives. For example, the computing group state may include information about computing instance distribution among the server(s), information about a number of servers currently executing computing instances, information about specific customer owned computing instances executing on the server(s), software licenses on a server, number of customer computing instance on servers (i.e., disaster impact information), as well as any other information that may be related to a computing state objective.

Using the computing group state information for the server(s), as in block 508, weighting values (i.e., determined by a machine learning model and historical placement metrics) for placement factors related to the computing group state at the time of computing instance placement may be identified. For example, a database containing weighting values for placement factors for various model computing group states generated by a machine learning model may be queried in order to identify weighting values for placement factors for the current computing group state of the computing service. As an illustration, information about a computing group state at the time of computing instance placement, such as a distribution of computing instances among the server(s) of a computing service may be used to identify a model computing group state with placement factors that include similar distribution information, as well as other computing group state information.

The weighting values for the placement factors included in the model computing group state may be referenced and the weighting values may be used in computations for ranking the available computing slots. In one example use case, after identifying placement factors for a model computing group state, a state of a server containing an available computing slot may be analyzed based on the placement factors. Based on the analysis, a placement factor score may be determined for the placement factors of the server and the weighting values of the placement factors may be applied to the placement factor scores to determine a placement score (e.g., ranking) for the computing slot.

As an illustration, analysis of a server containing a computing slot may be conducted based on several placement factors: a server utilization placement factor, a disaster impact placement factor and a software licensing placement factor. The analysis of the server may reveal that the server, according to the server utilization placement factor may be executing below capacity (e.g., the server contains multiple computing slots that are not occupied by computing instances), that according to the disaster impact placement factor a majority of computing instances executing on the server are owned by different customers, and that according to the software licensing placement factor a majority of the computing instances are executing the same licensed software. A numerical score in each of the placement factors may then be set based on the server's state. This may be a raw numeric value (e.g., 1 to 65,536, a fractional value between 0 and 1, or some other raw score) or a ranking score within the system. The weighting values of the placement factors (e.g., the server utilization placement factor, the disaster impact placement factor and the licensing placement factor) may then be used for computations of a placement score for the computing slot by applying the weighting values to the numerical score in each of the placement factors as is described next.

As in block 510, a placement score may be calculated for a computing slot based on the weighted values for to the computing slot. In one example, a placement score may be calculated by multiplying or summing the placement factor values as adjusted by the weighting values. In another example, an average, mean, median or mode may be calculated using the placement factor values as adjusted by the weighting values. The placement score may represent a fitness of a computing slot to execute a computing instance based on a predetermined computing group state objective. As an illustration, where a predetermined computing group state objective may be to maximize server utilization, decrease an impact on a customer due to a computing service failure, and to minimize licensing costs, a placement score may reflect a fitness of a computing slot which meets these objectives.

In response to a request to locate an available computing slot to execute a computing instance, an available computing slot with a placement score indicating a fitness that promotes a computing group state objective may be returned. In one example configuration, a computing slot having a high placement score may indicate that the computing slot may be the best candidate to execute a computing instance. Therefore, as in block 512, the computing slot with the highest placement score may be returned in response to a computing instance placement request. As will be appreciated, any method may be used to score or rank available computing slots within a computing service and as such, the value of a placement score (e.g., low or high) indicating a fitness of a computing slot may be determined by the method selected to determine a placement score.

The following figures (i.e., FIG. 6, FIG. 7, FIG. 8, FIG. 9 and FIG. 10) illustrate example placement factors that may be included in a computing group state. The placement factors may represent computing group state objectives for a computing service. Although the example placement factors are discussed individually below, a computing group state may include multiple placement factors with an associated weighting value that may be used to calculate a placement score for a computing slot.

Figure 6:
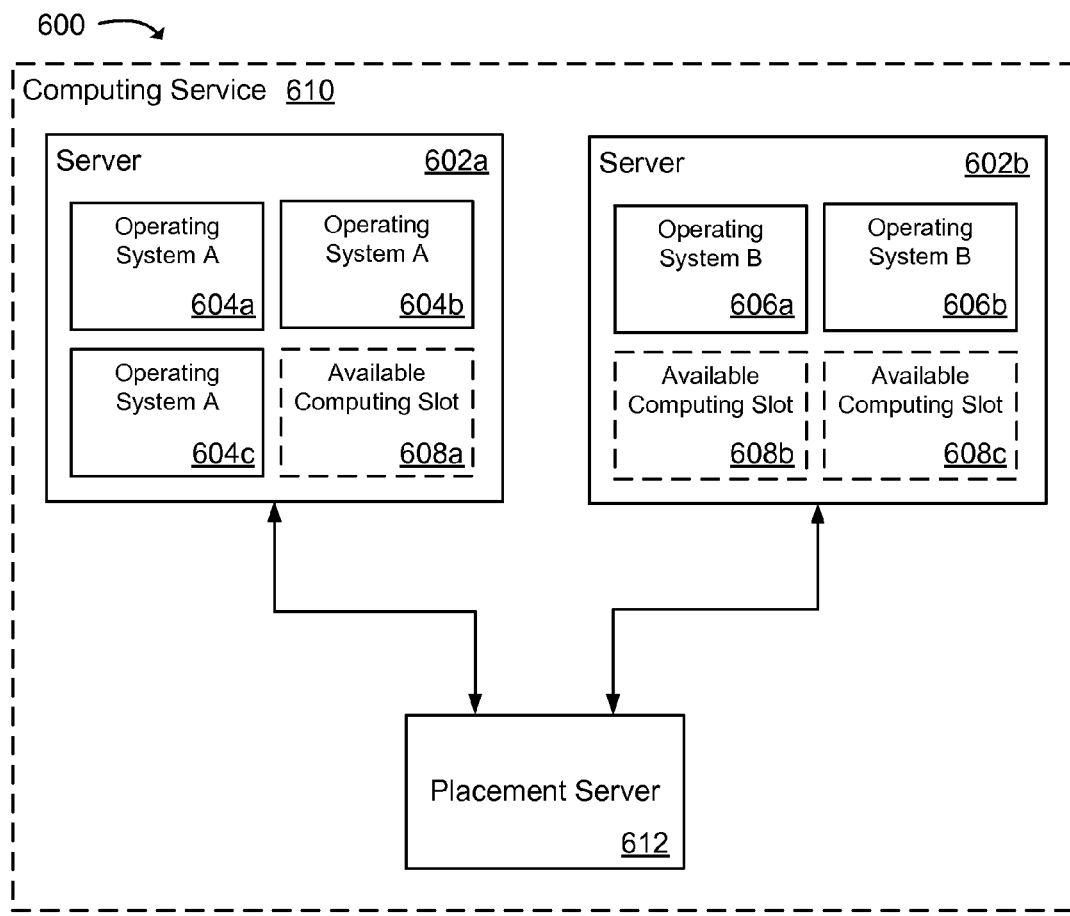
FIG. 6 is a block diagram illustrating an example system executing a computing service environment showing a computing group state of the computing service based on software licensing distribution among a plurality of servers.

FIG. 6 is a block diagram illustrating an example of a system 600 executing a computing service 610 where the computing group state of the computing service 610 is shown. The system 600 may include a number of servers 602a-b with a number of computing instances 604a-c and 606a-b executing various operating systems, as well as a number of available computing slots 608a-c that can execute a computing instance 604a-c and 606a-b. The system 600 may also include a placement server 612 that may be used to select an available computing slot 608a-c that furthers a computing group state objective to minimize software licensing costs associated with executing a computing instance 604a-c and 606a-b.

The computing group state in this example illustrates distribution of software (e.g., operating systems) executing on the computing instances 604a-c and 606a-b among the servers 602a-b. In an example case, a service provider may be charged a software license fee by a software vendor for an instance of a software application being executing on a server, but the software vendor may allow for multiple instances of the software application to execute on the server without additional cost. As a result, the service provider may wish to limit execution of the software to as few servers as possible. Thus, when determining a placement of a computing instance in an available computing slot 608a-c on a server 602a-b, a placement factor used to calculate a placement score for a computing slot 608a-c may be a licensing placement factor that may be weighted based on a computing group state of software license distribution among the servers 602a-b.

As an illustration, a computing service 610 may include a first server 602a and a second server 602b. The first server 602a may have a number of computing instances 604a-c executing a first operating system (Operating System A). The second server 602b may have a number of computing instances 606a-b executing a second operating system (Operating System B). A request may be received to launch a computing instance set to execute the first operating system (Operating System A). Based on the computing group state of the first server 602a and the second server 602b, a computing group state may be identified where a licensing placement factor may be emphasized. Placement scores may be calculated for the available computing slots 608a-c by applying the weighting value of the licensing placement factor to a factor for a computing slot score, and a computing slot 608a may be selected having a placement score indicating that selection of the computing slot 608a may create or maintain a computing group state that helps minimize software licensing costs.

Figure 7:
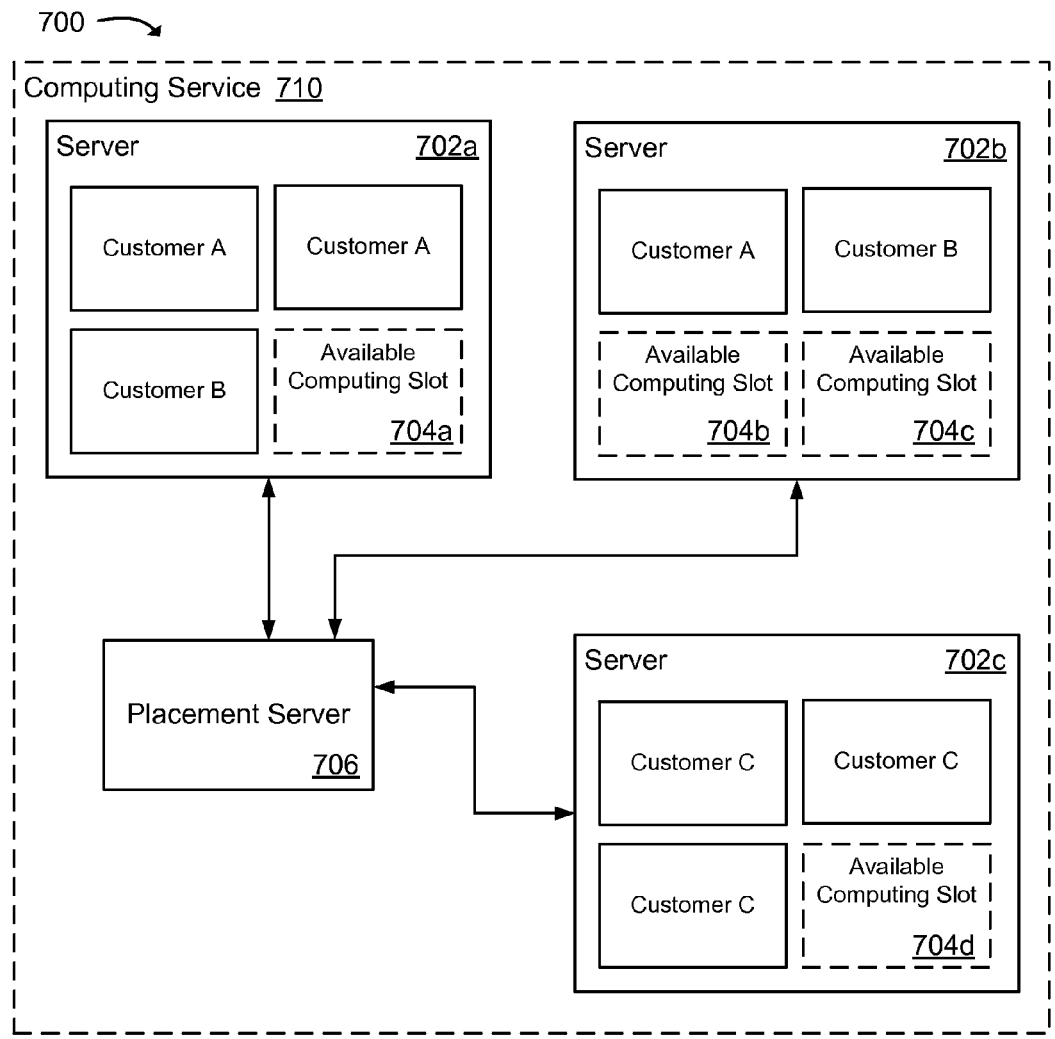
FIG. 7 is a block diagram that illustrates an example system executing a computing service environment displaying a computing group state of the compute service based on a disaster impact on a server.

FIG. 7 is a block diagram illustrating an example of a system 700 executing a computing service 710 where the computing group state of the computing service 710 is shown. The system 700 may include a number of servers 702a-c executing computing instances owned by various customers. Also included in the system 700 may be a placement server 706 that may be used to select an available computing slot 704a-d that furthers a computing group state objective to minimize an impact on a customer due to a failure (e.g., power failure, network failure, hardware failure, etc.) within the computing service environment.

In this example, a service provider may seek to minimize an impact of a computing service failure on a customer by distributing a customer's computing instances over multiple servers 702a-c. As a result, when a request to launch a computing instance for a customer is received, the servers 702a-c may be queried for a computing group state (e.g., to identify which servers 702a-c may be executing computing instances owned by the customer). Placement factors for the computing group state may then be identified, where a placement factor may underscore distributing instances to de-emphasize a disaster impact placement factor. Placement scores may be calculated for available computing slots 704a-d by applying the weighting value to a disaster impact factor score for a server 702a-b to generate a placement score and a computing slot 704a-d may be selected that has a placement score indicating that selection of the computing slot 704a-d may create or maintain a computing group state that helps minimize a disaster impact on the customer due to a computing system failure.

As an illustration, the placement server 706 may receive a request to place a computing instance for Customer C. The computing group state of the servers 702a-c may show that Customer C's computing instances are executing on a single server 702c and therefore are vulnerable should the server 702c experience a failure. As such, placement scores for the available computing slots 704a-d based on a placement factors for the computing group state may result in placing Customer C's computing instance on a server 702a or 702b that does not contain Customer C's other executing computing instances.

Figure 8:
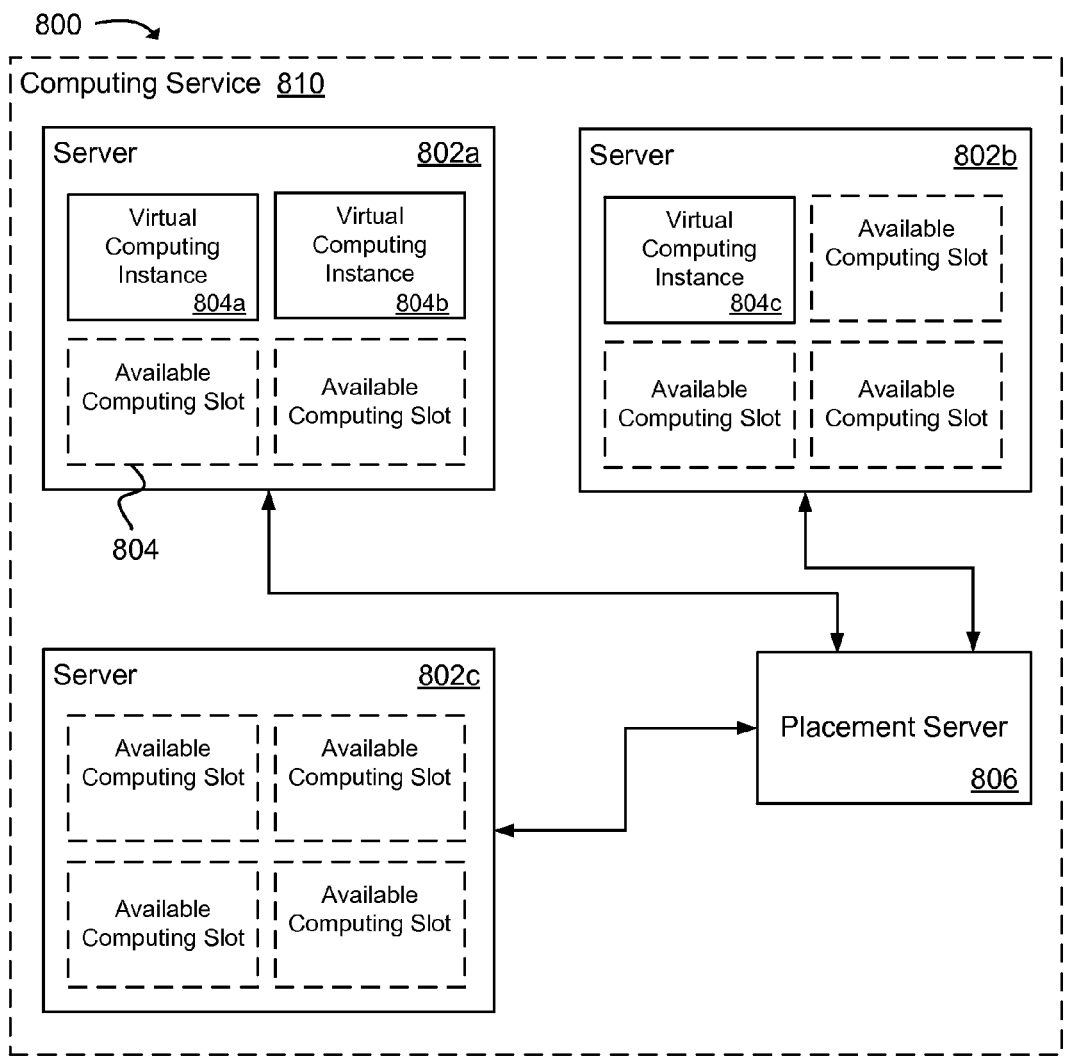
FIG. 8 is a block diagram illustrating an example system executing a computing service environment showing a computing group state of the compute service based on server utilization.

FIG. 8 is a block diagram illustrating an example of a system 800 executing a computing service 810 where the computing group state of the computing service 810 is shown. The system 800 may include a number of servers 802a-c having available computing slots and executing a number of computing instances 804a-c. Also included in the system 800 may be a placement server 806 that may be used to select an available computing slot furthering a computing group state objective to maximize server utilization within the computing system.

In one example, a service provider may seek to maximize use of a server's resources by filling the server's computing slots with computing instances. In other words, the service provider may seek to utilize the full capacity (memory and processing) of a server 802a-c to execute as many computing instances as possible.

As an illustration of placing a computing instance with an objective to maximize server utilization, the placement server 806 may receive a request to place a computing instance on a server 802a-c. The servers 802a-c may be queried for a computing group state, which may show that three servers 802a-c may contain available computing slots in which the computing instance may be placed. The computing group state may also show that the servers 802a-c may not be fully utilized. Placement factors may then be identified for the computing group state that includes a server utilization placement factor. Placement scores for the available computing slots may then be calculated by applying the weighting value to the server utilization placement factor to create a computing slot score and a computing slot 804 may be selected that has a placement score indicating that selection of the computing slot 804 may create or maintain a computing group state that maximizes server utilization with the computing service 810.

Figure 9:
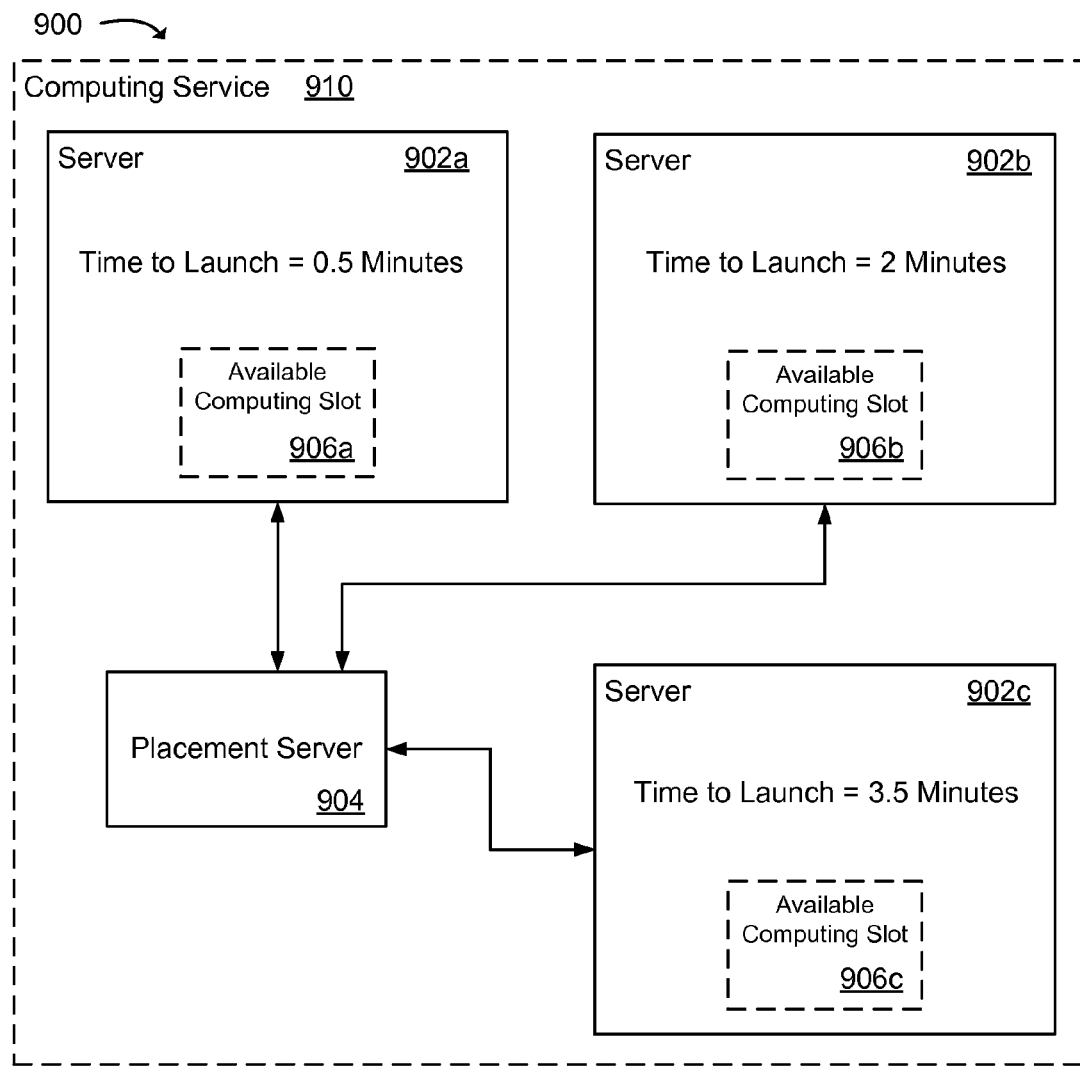
FIG. 9 is a block diagram that illustrates an example system executing a computing service displaying a computing group state of the compute service based on a time to launch a computing instance on a server.

FIG. 9 is a block diagram illustrating an example of a system 900 executing a computing service 910 where a computing group state of the computing service 910 shows a time to launch a computing instance. In this example, the system 900 may include a number of servers 902a-c having available computing slots 906a-c. Also included in the system 900 may be a placement server 904 that may be used to select an available computing slot 906a-c and may promote a computing group state objective to maximize a launch time of a computing instance on a server 902a-c.

In this example, when launching a computing instance on a server 902a-c, an amount of time in which to launch the computing instance may be affected by the state of the server 902a-c. For example, the state of a server 902a-c may be affected by other computing instances that may be queued to launch prior to launching a computing instance, a certain amount of time that may be needed to prime a computing instance, as well as other conditions that may affect a launch time of a computing instance. Based on the state of a server 902a-c, launch times may vary between the servers 902a-c. As a result, a launch time of a computing instance on a server 902a-c may be considered when selecting an available computing slot 906a-c.

As an illustration, upon a placement server 904 receiving a placement request, the servers 902a-c of a computing service 910 may be queried for a computing group state (e.g., a computing instance launch time for each server). Placement factors may then be identified for the computing group state that may include an instance launch time placement factor. Based on a placement score calculated by applying a weighting value to the launch time placement factor to create a computing slot score for the various available computing slots 906a-c, an available computing slot 906a may be selected having a placement score indicating that the selection of the computing slot 906a may result in launching the computing instance on a server 902a having a shorter launch time as compared to other servers 902b-c within the computing service 910.

Figure 10:
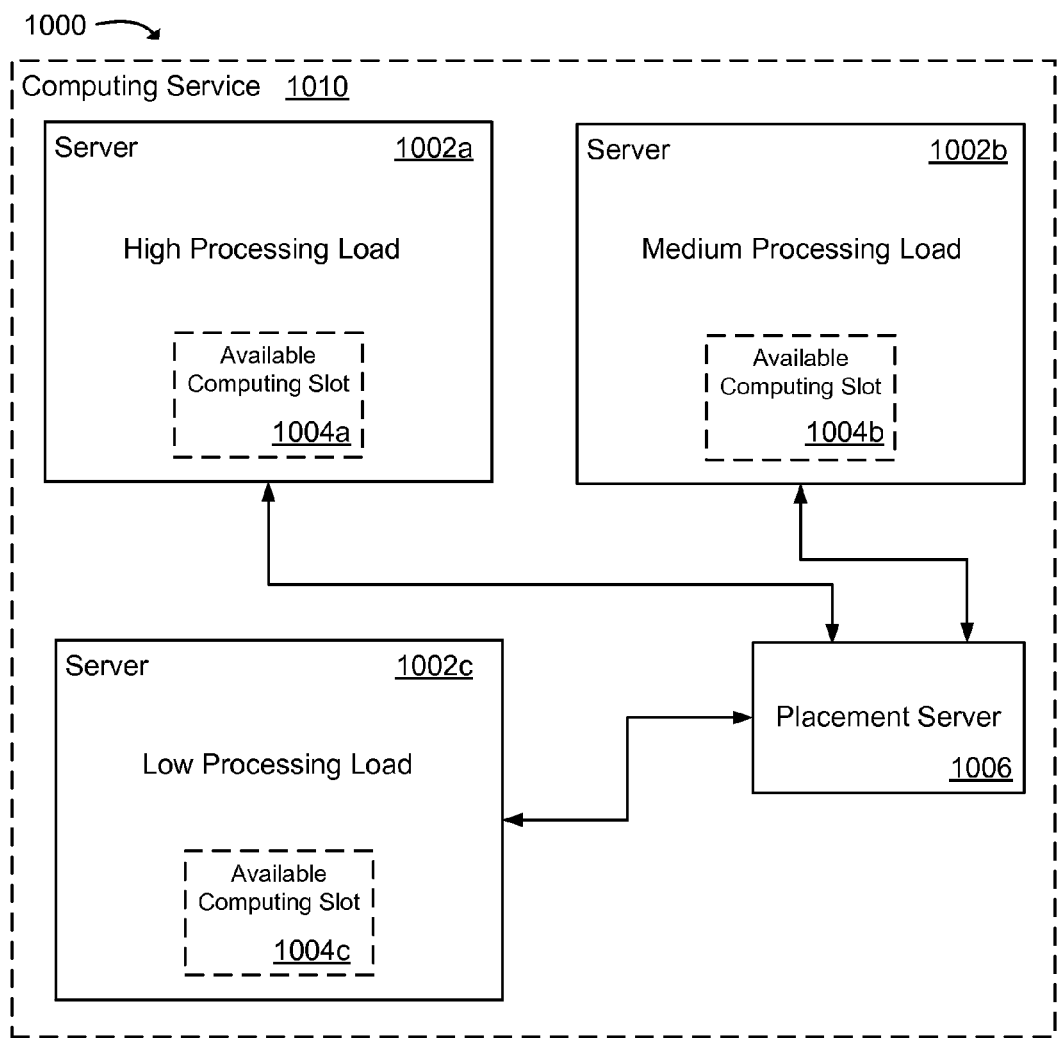
FIG. 10 is a block diagram illustrating an example system executing a computing service showing a computing group state of the compute service based on a processing load of a server.

FIG. 10 is a block diagram illustrating an example of a system 1000 executing a computing service 1010 where a computing group state of the computing service 1010 shows a processing load of a server 1002a-c executing a number of computing instances. The system 1000 may include a placement server 1006 that may be used to select an available computing slot 1004a-c that may promote a computing group state objective to minimize an impact of transitory events on executing computing instances.

For example, some events, such as launching a computing instance on a server 1002a-c, a high volume of database or a high volume of page requests, may create a spike in use of the servers 1002a-c computing resources. The spike in use of the computing resources may affect the performance of already executing computing instances on the server 1002a-c. As such, using the method described earlier, a computing slot 1004c located on a server 1002c having a low processing load may be selected to launch a computing instance.

Figure 11:
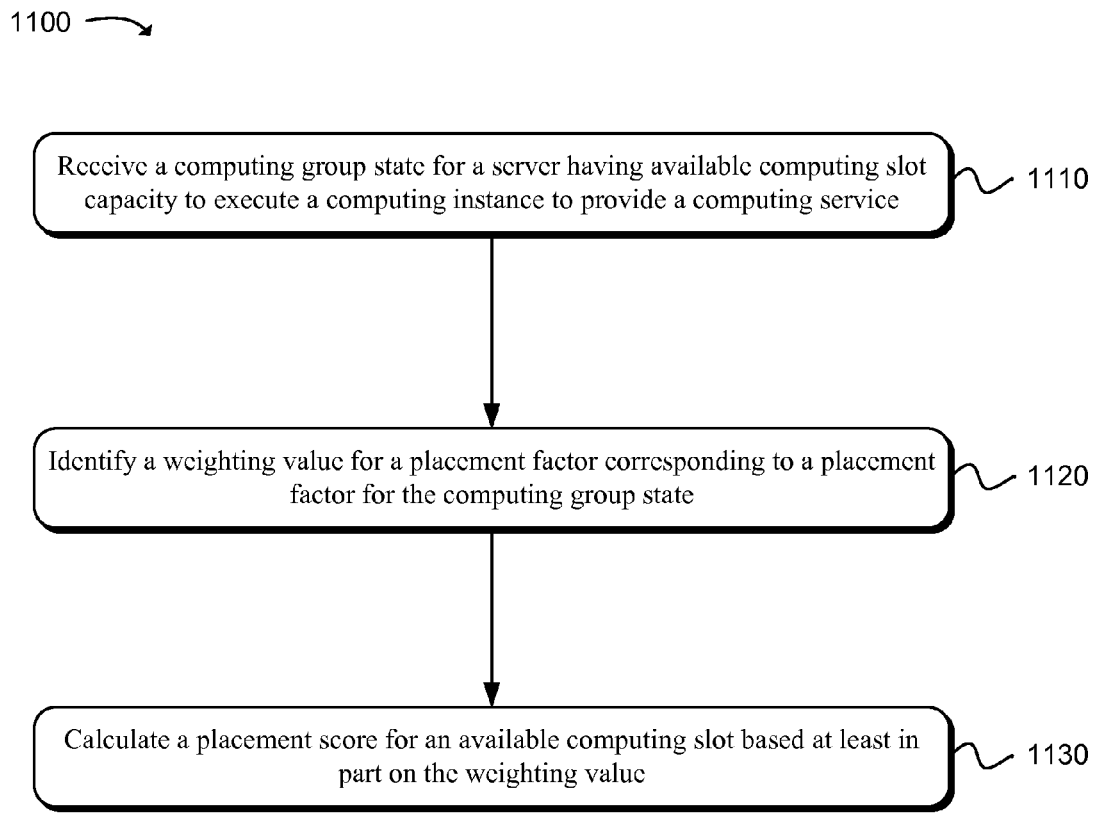
FIG. 11 is a flow diagram illustrating an example method for determining a placement of a computing instance within a compute service environment.

FIG. 11 is a flow diagram illustrating an example method for determining a placement of a computing instance within a computing service. As in block 1110, a computing group state may be received for a server providing a computing service having available computing slot capacity to execute a computing instance. The computing group state may provide information about various aspects of one or more servers within the computing service.

As in block 1120, a weighting value for a placement factor corresponding to a placement factor for the computing group state may be identified. A placement factor may represent an aspect of a computing group state and may contribute to one or more predetermined computing group state objectives. The weighting values for the placement factors may be used, as in block 1130, to calculate a placement score for an available computing slot located on a server within the computing service. An available computing slot having a placement score indicating that the computing slot may be a good candidate for promoting one or more computing group state objectives, and the slot may be selected and a computing instance may then be launched on the server having the available computing slot.

Figure 12:
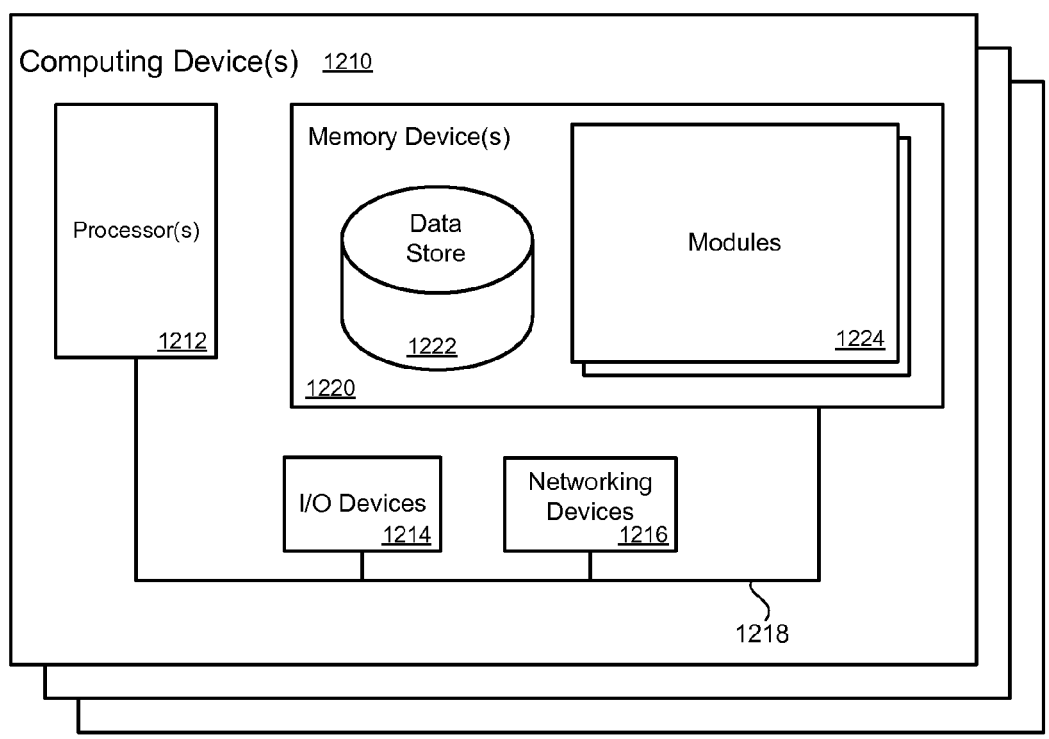
FIG. 12 is block diagram illustrating an example of a computing device that may be used to execute a method for determining a placement of a computing instance on a server.

FIG. 12 illustrates a computing device 1210 on which modules of this technology may execute. A computing device 1210 is illustrated on which a high level example of the technology may be executed. The computing device 1210 may include one or more processors 1212 that are in communication with memory devices 1220. The computing device 1210 may include a local communication interface 1218 for the components in the computing device. For example, the local communication interface 1218 may be a local data bus and/or any related address or control busses as may be desired.

The memory device 1220 may contain modules 1224 that are executable by the processor(s) 1212 and data for the modules 1224. The modules 1224 may execute the functions described earlier. A data store 1222 may also be located in the memory device 1220 for storing data related to the modules 1224 and other applications along with an operating system that is executable by the processor(s) 1212.

Other applications may also be stored in the memory device 1220 and may be executable by the processor(s) 1212. Components or modules discussed in this description that may be implemented in the form of software using high programming level languages that are compiled, interpreted or executed using a hybrid of the methods.

The computing device may also have access to I/O (input/output) devices 1214 that are usable by the computing devices. Networking devices 1216 and similar communication devices may be included in the computing device. The networking devices 1216 may be wired or wireless networking devices that connect to the internet, a LAN, WAN, or other computing network.

The components or modules that are shown as being stored in the memory device 1220 may be executed by the processor(s) 1212. The term "executable" may mean a program file that is in a form that may be executed by a processor 1212. For example, a program in a higher level language may be compiled into machine code in a format that may be loaded into a random access portion of the memory device 1220 and executed by the processor 1212, or source code may be loaded by another executable program and interpreted to generate instructions in a random access portion of the memory to be executed by a processor. The executable program may be stored in any portion or component of the memory device 1220. For example, the memory device 1220 may be random access memory (RAM), read only memory (ROM), flash memory, a solid state drive, memory card, a hard drive, optical disk, floppy disk, magnetic tape, or any other memory components.

The processor 1212 may represent multiple processors and the memory 1220 may represent multiple memory units that operate in parallel to the processing circuits. This may provide parallel processing channels for the processes and data in the system. The local interface 1218 may be used as a network to facilitate communication between any of the multiple processors and multiple memories. The local interface 1218 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions being executable by a processor to perform a method for determining computing instance placement, comprising:

receiving a computing group state for a plurality of servers having available computing slot capacity to execute a computing instance to provide computing services, wherein the computing group state includes information about placement factors;

identifying a plurality of weighting values for placement factors that correspond to the placement factors for the computing group state;

calculating a placement score for an available computing slot based at least in part on the weighting values; and selecting an available computing slot having a high placement score as compared to placement scores for other computing slots.

2. A non-transitory machine readable storage medium as in claim 1, further comprising generating the plurality of weighting values using a neural network model that uses historical placement metrics to determine a weighting value for a placement factor.

3. A non-transitory machine readable storage medium as in claim 1, wherein receiving the computing group state further comprises receiving a computing group state with at least one of: a server utilization placement factor, a licensing placement factor, a disaster impact placement factor, a system impact placement factor or an instance launch time placement factor.

4. A computer implemented method, comprising:
under control of one or more computer systems configured with executable instructions, receiving a computing group state for a server having available computing slot capacity to execute a computing instance to provide a computing service;
identifying a weighting value for a placement factor corresponding to a placement factor for the computing group state; and
calculating a placement score for an available computing slot based at least in part on the weighting value.

5. A method as in claim 4, further comprising receiving a request for an available computing slot in which to load a computing instance;
identifying a server providing a computing service having an available computing slot;
requesting state information from the server;
determining a placement factor score for the server based at least in part on the state information;
applying the weighting value to the placement factor score for the server; and
calculating the placement score from a plurality of placement factor scores.

6. A method as in claim 4, wherein identifying a weighting value for the placement factor further comprises querying a data store for a placement factor that corresponds with the placement factor for the computing group state.

7. A method as in claim 4, further comprising determining weighting values based at least in part on historical placement metrics using a machine learning model.

8. A method as in claim 7, wherein determining a weighting value using a machine learning model further comprises:
comparing a first computing group state of a computing service to a second computing group state of the computing service, wherein the first computing group state represents a state of a computing service prior to placing a computing instance and the second computing group state represents a state of the computing service after placement of the computing instance; and
assigning a weighting value to a placement factor associated with the first computing group state based upon results of comparing the first computing group state with the second computing group state.

9. A method as in claim 7, wherein determining the weighting value using a machine learning model further comprises determining a weighting value for the placement factor using a machine learning model selected from at least one of: a neural network model, a genetic algorithm model, a regression model or a hidden Markov model.

10. A method as in claim 7, wherein requesting state information from the server further comprises, requesting state information that corresponds to a placement factor related to a predetermined computing group state objective for the computing service.

11. A method as in claim 10, wherein assigning a weighting value to a placement factor further comprises reducing a weighting value assigned to a first placement factor when an objective associated with the first placement factor conflicts with an objective associated with a second placement factor.

12. A method as in claim 4, further comprising selecting a computing slot having a high placement score as compared to placement scores for other computing slots and loading a computing instance on a server containing the computing slot.

13. A method as in claim 4, wherein identifying the weighting value for a placement factor corresponding to a placement factor for the computing group state further comprises identifying a server utilization placement factor that accounts for a number of available computing slots on a server providing a computing service.

14. A method as in claim 4, wherein identifying the weighting value for a placement factor corresponding to a placement factor for the computing group state further comprises identifying a disaster impact placement factor for a customer that accounts for a number of computing instances for a customer that are impacted by a computing service failure.

15. A method as in claim 4, wherein identifying the weighting value for a placement factor corresponding to a placement factor for the computing group state further comprises identifying an instance launch time placement factor that accounts for an amount of time needed to launch a computing instance on a server providing a computing service.

16. A method as in claim 4, wherein identifying the weighting value for a placement factor corresponding to a placement factor for the computing group state further comprises identifying a licensing placement factor that accounts for a cost of software licensing fees associated with launching a computing instance on a server providing a computing service.

17. A system for determining computing instance placement, comprising:
a processor;
a memory device including instructions that, when executed by the processor, cause the system to:
identify an available computing slot on a server executing a computing service based at least in part on a placement score for an available computing slot, wherein the server is queried for available computing slot capacity to execute a computing instance and for a computing group state of the computing service;
identify a weighting value for a placement factor included in the computing group state of the computing service; and
calculate a placement score for the available computing slot based at least in part on the weighting value.

18. A system as in claim 17, wherein the memory device including instructions that, when executed by the processor, cause the system to determine a weighting value for a placement factor based at least in part on a current computing group state using a machine learning model.

* * * * *